United States Patent
Rushing et al.

[11] Patent Number: 6,044,674
[45] Date of Patent: Apr. 4, 2000

[54] NUT ENCLOSURE LOCK

[76] Inventors: Robert E. Rushing; Linda L. Rushing, both of 908 Elliott Ave., Alton, Ill. 62002

[21] Appl. No.: 09/089,576

[22] Filed: Jun. 3, 1998

[51] Int. Cl.$^7$ .................................................. F16B 41/00
[52] U.S. Cl. ................................ 70/232; 411/910; 70/18
[58] Field of Search ............................ 70/18, 58, 232, 70/DIG. 57; 411/910

[56] References Cited

U.S. PATENT DOCUMENTS

| | | | |
|---|---|---|---|
| 1,296,165 | 3/1919 | Costuma | 411/910 |
| 1,877,545 | 9/1932 | Wise . | |
| 2,218,126 | 10/1940 | Thacher | 70/231 |
| 3,600,914 | 8/1971 | Johnson et al. | 70/232 |
| 3,765,197 | 10/1973 | Foote | 70/58 |
| 3,789,635 | 2/1974 | Van Brunt et al. | 70/232 |
| 3,808,847 | 5/1974 | Vesely | 70/18 |
| 3,913,880 | 10/1975 | Lucasey et al. | 248/415 |
| 3,928,990 | 12/1975 | Stenz | 70/58 |
| 4,055,973 | 11/1977 | Best | 70/58 |
| 4,065,946 | 1/1978 | Loynes et al. | 70/58 |
| 4,374,509 | 2/1983 | Kawabata et al. | 123/146.5 |
| 4,444,031 | 4/1984 | Watson | 70/232 |
| 4,548,061 | 10/1985 | Nilsson | 70/370 |
| 4,552,001 | 11/1985 | Roop | 70/208 |
| 4,688,408 | 8/1987 | Shroyer | 70/226 |
| 4,710,082 | 12/1987 | Curtis | 411/910 |
| 4,736,603 | 4/1988 | Brushaber | 70/232 |
| 4,754,628 | 7/1988 | Siegel | 70/230 |
| 5,010,748 | 4/1991 | Derman | 70/164 |
| 5,027,627 | 7/1991 | Derman | 70/164 |
| 5,214,945 | 6/1993 | Martin | 70/232 |
| 5,351,507 | 10/1994 | Derman | 70/18 |
| 5,433,094 | 7/1995 | Sandin et al. | 70/232 |
| 5,447,044 | 9/1995 | Cheng | 70/58 |
| 5,469,726 | 11/1995 | Rushing et al. | 70/232 |
| 5,630,687 | 5/1997 | Robinson | 411/910 |
| 5,794,463 | 8/1998 | McDaid | 70/DIG. 57 |

FOREIGN PATENT DOCUMENTS

| | | | |
|---|---|---|---|
| 88-255024/36 | 8/1988 | Netherlands | 70/225 |
| 2/185 282 | 7/1987 | United Kingdom | 70/58 |

*Primary Examiner*—Suzanne Dino Barrett
*Attorney, Agent, or Firm*—Bruce E. Burdick

[57] ABSTRACT

A device for preventing access to a nut or bolt fastening a valuable item such as an outboard motor on a boat, a riding lawnmower to a burglar cable, or the like. The device is independent of the nut and bolt, and includes a body that receives the bolt head or nut in a chamber, with the shaft protruding to the exterior where it is threadedly fastened to the valuable item. At a second aperture the chamber receives a flanged plug that prevents access to the head of the bolt. A locking pin threadedly engaged through a third aperture in the body engages an annular indented region on the plug to prevent its removal. A unique head on the locking pin is matched with the same style key to thread and unthread the locking pin from the body. An optional slotted chamber design permits securing of a cable to the nut and bolt combination by including a slot in the body that is occluded by the plug when it is inserted into the chamber and locked by the locking pin.

26 Claims, 1 Drawing Sheet

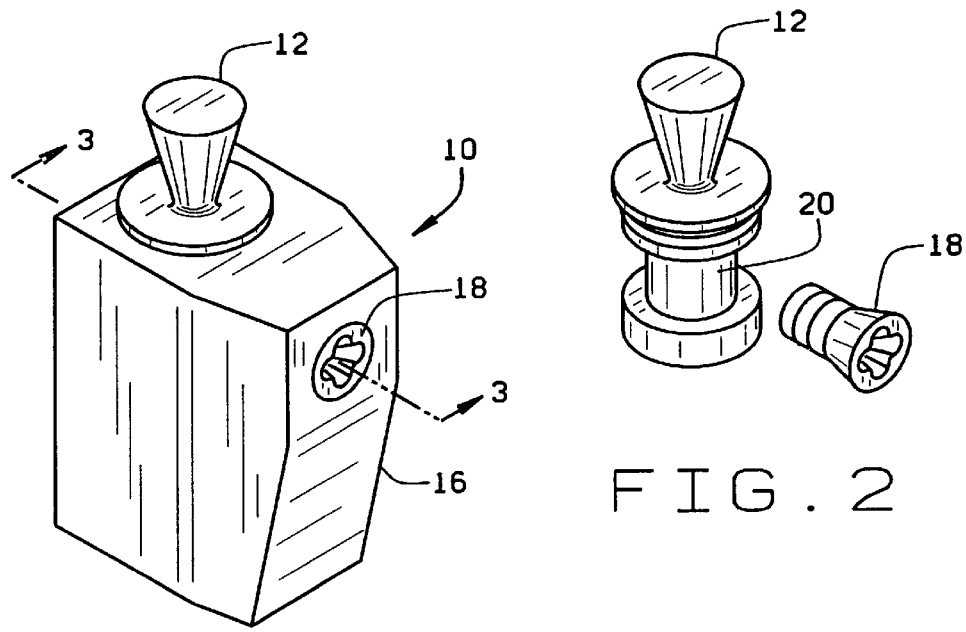
FIG. 1
FIG. 2
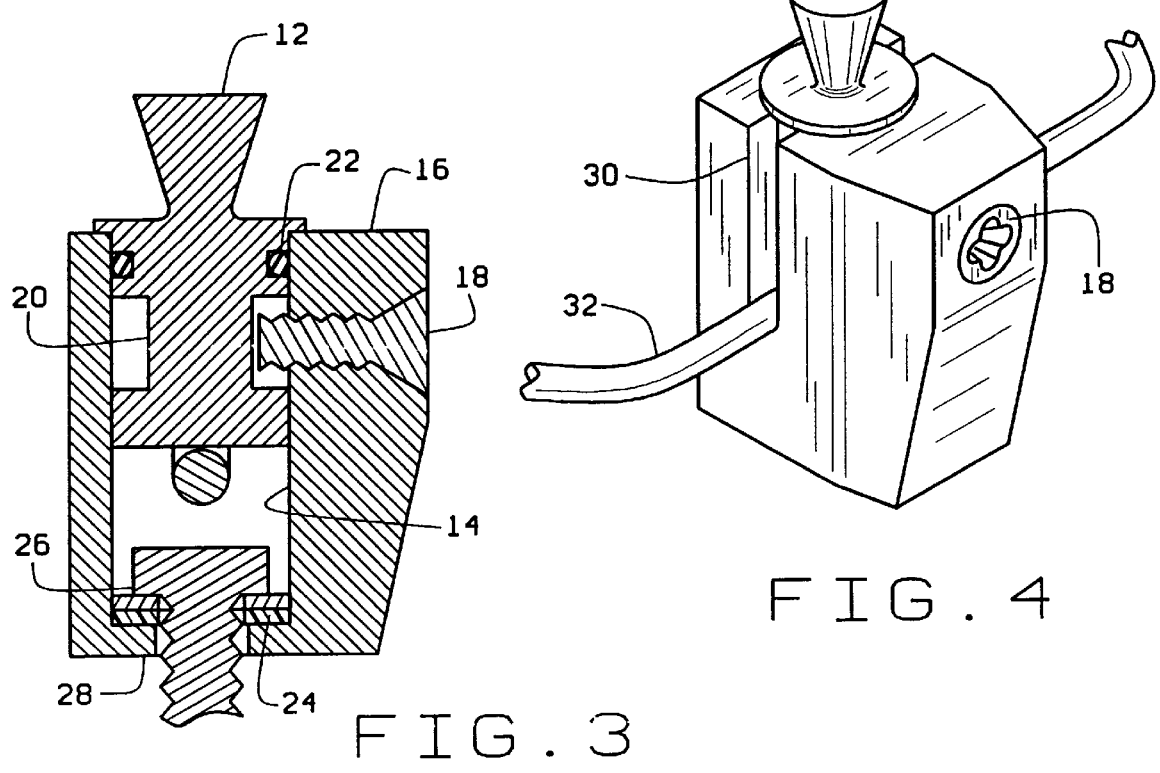
FIG. 3
FIG. 4

NUT ENCLOSURE LOCK

BACKGROUND OF THE INVENTION

1. Field of the Invention

The present invention relates to security devices and, more specifically, to security devices for preventing access to a nut or bolt in order to prevent theft of an article through which the bolt passes.

2. Related Art

In many applications a nut and a bolt are used to secure one object to another. For example, nuts and bolts commonly used to mount outboard motors to the transoms of boats. Similarly, wheels and spare wheels are commonly mounted on automobiles through use of nuts and bolts.

In the case of an outboard motor, two bolts are typically used to secure mounting arms that depend from the motor to a boat transom. This mounting configuration leaves the head of the bolt exposed on one side, and the nut exposed on the other side. Thus, a thief with simple tools may remove the motor from the boat by merely unthreading the nut from the bolt.

Similarly, outdoor lawn equipment such as riding lawnmowers is often stored or displayed outdoors, where the equipment is vulnerable to theft overnight. One solution to this problem has been to run a cable through a suitable aperture on each piece of such equipment to make the removal of each item more difficult. A drawback to this approach is that gaining legitimate access to a given item so secured often requires unthreading the cable from a number of other, unneeded items, through which the cable must subsequently be rethreaded.

Thus a need exists for a device that prevents unauthorized removal of equipment secured to another object by bolts. Past efforts to provide systems to prevent unwanted removal of the nuts from the bolts have been evidenced by patents issued on such systems. In particular, U.S. Pat. No. 5,469,726 to Rushing et al. describes such a device. A further need exists for a device that permits the rapid attachment and detachment of a cable to an object comprising a nut and bolt.

SUMMARY OF THE INVENTION

The present invention is directed toward solving this problem by preventing access to the nut of a bolt that retains a valuable commodity, and in one embodiment, by providing a means to secure a cable to a nut and bolt.

It is thus an object of the present invention to provide a simple means of preventing the removal of a bolt.

It is another object of the present invention to provide a means of preventing removal of a bolt without requiring modification of the equipment to be secured.

It is also an object of the present invention to provide a means of preventing removal of a bolt while leaving the equipment useable with the security device in place.

It is also an object of the present invention to provide a means of preventing access to a bolt with a device that can be quickly and easily installed with readily available tools.

It is further an object of the present invention to provide a simple yet effective means of limiting access to a bolt to those with a special key.

It is another object of the present invention to provide a means of preventing removal of a bolt in a device that resists corrosion.

It is another object of the present invention to provide a nut lock for marine applications.

It is still another object of the present invention to provide a nut lock that is essentially independent of the nut and bolt.

It is also an object of the present invention to provide a means of securing a cable to a bolt so as to prevent removal of the device bearing the bolt.

In accordance with the above objects, the present invention provides a locking housing for a bolt that prevents unauthorized access to the head of the bolt. In one embodiment, the present invention is a nut enclosure lock having a body with a chamber and a shaft aperture through which the bolt fits, with the head of the bolt inside the chamber. Access to the head is restricted by a flanged plug that fits inside the chamber, where a locking pin that fits through the body engages an indented region on the plug and prevents its removal. The locking pin includes a unique head that must be matched with the same style key in order to thread and unthread the pin. Seals at the plug aperture and shaft aperture, and beveling on the head of the locking pin, ensure a watertight seal for marine applications.

In another embodiment, the present invention has the features described above, and also a slot in the body into which a cable fits. The slot is so situated that the insertion of the plug into the chamber occludes the slot as well as preventing access to the head of the bolt. Insertion of the locking pin into the indented region on the plug then prevents removal not only of the plug, but also of the cable.

BRIEF DESCRIPTION OF THE DRAWINGS

So that the manner in which the above recited features, advantages and objects of the present invention are attained and can be understood in detail, a more particular description of the invention briefly summarized above, may be had by reference to the embodiment thereof that is illustrated in the appended drawings, wherein:

FIG. 1 shows a front upper left exterior view of an assembled nut enclosure lock according to one embodiment of the invention;

FIG. 2 shows the nut enclosure lock plug and locking pin of FIG. 1;

FIG. 3 shows a side cross-sectional view of the nut enclosure lock of FIG. 1 taken along lines 3—3;

FIG. 4 shows a front upper left exterior view of the assembled nut enclosure lock of a second embodiment of the invention adapted for securing a cable.

It is to be noted, however, that the appended drawings illustrate only two typical embodiment of the invention and that they are therefore not to be considered limiting of its scope, for the invention may admit to other equally effective embodiments.

DETAILED DESCRIPTION OF THE INVENTION

Referring to FIG. 1, in nut enclosure lock assembly 10 comprises a plug 12, a body 16, and a locking pin 18. The upper portion of plug 12 is shown projecting upwardly out of body 16 and has an outwardly flared knob so that the plug may be removed by hand. Locking pin 18 is shown flush with the front side of the body 16 and has a unique head that must be matched with a suitable key to permit it to be withdrawn from body 16. Body 16 is shown with an optional flat rear side on its exterior whereby the flat side can fit against a flat surface of the device (not shown), such as the lower unit of a MercCruiser inboard/outboard motor to which the threaded fastener is attached to help prevent turning of the body relative to the device.

Referring to FIG. 2, locking pin 18 in shown with threads that would engage with the body and a beveled head or front end for helping render the assembly waterproof. Plug 12 is shown as having an indented portion 20 to receive the rear end or tip of pin 18 to interfere with and thus prevent vertical movement of plug 12 and thus help prevent removal of plug 12 from body 16.

Referring to FIG. 3, the internal details of the locking assembly of FIG. 1 are shown in assembled and locked position. Plug 12 has been inserted downwardly into chamber 14 of body 16 to a depth determined by an outward upper flange and makes a watertight junction by means of seal 22. The flange on plug 12 positions it in chamber 14 such that locking pin 18 engages plug 12 through indented region 20. Bolt 26 (which could be any suitable fastener with an enlarge upper portion) has a shaft that fits through shaft aperture 28 of body 16, where sealing washer 24 prevents water from entering chamber 14 through the shaft aperture. Washer 24 also minimizes frictional force between bolt 26 and body 16 to prevent a would-be thief from removing bolt 26 by lifting body 16 with sufficient force to turn bolt 26 merely by turning body 16. Washer 24 is shown as two washers, an upper metal washer to reduce the frictional force between the head of bolt 26 and the washer 24 and a lower elastomeric portion to resiliently seal the space between the shaft of bolt 26 and shaft aperture 28 of body 16. If desired, a "Nylock" washer could be used to lock the enlarged portion of the bolt or stud and nut against loosening by turning the body 16. Shaft aperture 28 is shown offset rearward from the center of body 14 toward a flat rear exterior side to permit the nut enclosure lock to fit in a restricted space (not shown) between bolt 26 and the device (not shown) to which bolt 26 is attached and to help prevent turning of the body relative to the device.

Referring to FIG. 4, a modified form of the assembly is shown with a slot 30 into which a cable 32 (which is not part of the invention, but to which slot 30 is preferably sized) fits into slot 30 and is held in place by plug 12, which is in turn held in place by locking pin 18. Plug 12 and its flange prevent removal of cable 32 from slot 30 when locking pin 18 is fully inserted in the locking pin aperture and engages indented portion 20.

All parts of the assembly except the lower portion of washer 24 could be made of #300 stainless steel or some other hard, corrosion-resistant material. This enables the use of the locking assembly on outboard motors or other outdoor equipment where exposure to sea water or other corrosive medium is expected.

Cable 32 could be part of a burglar alarm system, for example of the type having an alarm responsive to any interruption of current through the cable such as would occur if the cable were cut. Such cables are commonly used by retail establishments to secure riding lawn mowers, gas grills, trailers, swing sets, and numerous other types of merchandise which is on display outside the enclosed portion of the establishment. The assembly of FIG. 4 could thus be placed over a bolt or stud nut attached to the merchandise and thus releasably secure the cable. The retailer could thus easily remove just a single piece of merchandise while leaving the remaining pieces of merchandise secured by cable 32.

In operation, the bolt 26 would be removed from the device to be secured and washer 24 and then bolt 26 placed shaft first downwardly through chamber 14 and shaft aperture 28. The locking assembly bolt 26 would then be placed back where bolt 26 was removed from and bolt 26 would be reattached to the device, but this time with the lower portion of the body between the bolthead and the device to prevent access to the bolt except through chamber 14. This tightening of bolt 26 would typically be done by a deep socket wrench inserted down into chamber 14 from above. Once bolt 26 was tightened, if a cable is to be locked, it would be inserted into slot 30 at this time. Next, plug 12 would be pushed down into chamber 14 until the plug flange came to rest atop body 16 as shown in FIGS. 1 and 3. Locking pin 18 would then be inserted through the locking pin aperture and tightened until its inner end (rear end in FIG. 14) projects into chamber 14 and into indented portion 20 to lock plug 12 in body 16. This completes the capture of bolt 26 and its enclosure in the locking assembly. In the case of FIG. 1 and FIG. 3, this also preferably renders the chamber 14 watertight.

Accordingly, it is also apparent from the foregoing that the present invention is not limited to the embodiments shown. Other equally effective embodiments are contemplated and within the scope of the present invention.

What is claimed is:

1. A locking assembly for preventing access to an enlarged diameter portion of a threaded fastener having a shaft, the locking assembly comprising:
   a) a body having a first end, a second end, and defining a chamber within said body, said chamber having a width and adapted to receive the enlarged portion of the fastener and for allowing rotational tightening and loosening of the enlarged portion within the chamber;
   b) a shaft aperture in said first end of the body communicating with the chamber, said shaft aperture being of a minimum width less than the width of the chamber and adapted to prevent passage of the enlarged portion through the shaft aperture and allow passage of the shaft through the shaft aperture;
   c) a locking screw having a first end and a second end and a threaded midportion therebetween;
   d) a plug aperture in said second end of said body having a greater width than the width of the shaft aperture and adapted to allow passage of the enlarged diameter portion of the fastener into the chamber;
   e) a locking screw aperture in said body extending from the exterior of the side of the body to the plug aperture and intersecting the plug aperture, said locking screw aperture being threaded to accept said first end and midportion of said locking screw and being of such a length to allow the locking screw to be fully seated and of such length that when said locking screw is fully seated in the locking screw aperture, the first end of the locking screw projects into the plug aperture and the second end is seated rigidly to prevent axial movement of the locking screw and accessible from the exterior of the body;
   f) a plug having a lower portion sized to fit within an upper portion of said plug aperture, said lower portion of said plug having a recess located so as to be aligned with the locking screw aperture when the plug is inserted into the plug aperture and the recess being adapted to accept said first end of said locking screw, so that placement of said first end of said locking pin through said locking screw aperture and into the recess prevents removal of the plug from the body and, by so doing, is for physically blocking removal from the chamber of the enlarge portion when the enlarged portion is contained in the chamber.

2. The locking assembly of claim 1, further comprising a knob on the upper portion of the plug so that the plug may be removed by hand when the first end is not in the recess.

3. The locking assembly of claim 1, further comprising a lateral flange on the plug, the flange being larger than the plug aperture to prevent overinsertion of the plug and upon full insertion of the plug to contact the body to assure that the plug is positioned within the body in a proper position to accept the first end of the locking screw.

4. The locking assembly of claim 1, further comprising a seal disposed between the plug and the body for sealing the plug aperture and a seal adjacent said shaft aperture for sealing between the body and a fastener to be captured in the chamber, whereby said chamber is made waterproof.

5. The locking assembly of claim 4, wherein said second end of said locking screw is beveled, and said body, adjacent the locking screw aperture, is beveled to sealingly accept said second end of said locking screw so as to prevent fluid from entering the chamber via the locking aperture, without need for a separate seal for the locking screw aperture.

6. The locking assembly of claim 1, wherein the body is made of a material that does not corrode in sea water.

7. The locking assembly of claim 6, wherein the body is made of stainless steel.

8. The locking assembly of claim 1, further comprising a slip washer adjacent said shaft aperture for being disposed between the enlarged portion of the threaded fastener and the body so that the enlarged portion cannot be turned by lifting and turning the body.

9. The locking assembly of claim 1, wherein said body and said locking screw have matching threads.

10. The locking assembly of claim 9, wherein said second end of said locking screw includes a unique recess pattern for receipt of a unique matching socket key for selectively permitting threading and unthreading said locking screw.

11. The locking assembly of claim 1, further comprising a threaded fastener located outdoors and having the enlarged portion.

12. The locking assembly of claim 11, wherein the threaded fastener to be locked fastens at least a portion of a motor to a boat.

13. The locking assembly of claim 1, wherein the body has a flat side on its exterior for fitting against a flat surface of a device to which the threaded fastener is attached to help prevent turning of the body relative to the device.

14. The locking assembly of claim 13, wherein the shaft aperture is offset from the center of the body toward the flat side, so as to permit the assembly to capture a fastener which is disposed close to an obstruction.

15. The locking assembly of claim 1, wherein the shaft aperture is offset from the center of the body toward the side of the body opposite the locking screw aperture for allowing the assembly to be placed over the enlarged portion with the locking aperture facing away from an obstruction when the enlarged portion is relatively close to the obstruction and the obstruction would otherwise physically interfere with the body.

16. A locking assembly for securing a cable to an enlarged diameter portion of a threaded fastener having a shaft, the locking assembly comprising:

a) a body having a first end, a second end, and defining a chamber within said body, said chamber having a width and adapted to receive the enlarged portion and for allowing rotational tightening and loosening of the enlarged diameter portion within the chamber;

b) a shaft aperture in said first end of the body communicating with the chamber, said shaft aperture being of a minimum width less than the width of the chamber and adapted to prevent passage of the enlarged portion through the shaft aperture and allow passage of the shaft through the shaft aperture;

c) a locking screw having a first end and a second end and a threaded midportion therebetween;

d) a plug aperture in said second end of said body and having a greater width than the enlarged diameter portion of the fastener;

e) a locking screw aperture in said body extending from the exterior of the side of the body to the plug aperture and intersecting the plug aperture, said locking screw aperture being threaded to accept said first end and midportion of said locking screw and being of such a length that when said locking screw is fully seated within the locking screw aperture, the first end of the locking screw projects into the plug aperture is accessible from the exterior of the body;

f) a plug having a lower portion sized to fit within an upper portion of said plug aperture, said lower portion of said plug having a recess located so as to be aligned with the locking screw aperture when the plug is inserted into the plug aperture and the recess being adapted to accept said first end of said locking screw, so that placement of said first end of said locking pin through said locking screw aperture and into the recess prevents removal of the plug from the body and, by so doing, is for physically blocking access to or removal from the chamber of the enlarged portion when the enlarged portion is contained in the chamber, and g) a slot in said body for removably receiving and capturing a continuous free midportion of the cable and situated such that presence of the plug in the plug aperture will prevent removal of the midportion of the cable from the slot in a direction transverse to the cable and where absence of the plug from the plug aperture will allow complete removal of the cable from the locking assembly.

17. The locking assembly of claim 16, further comprising a knob on the upper portion of the plug so that the plug may be removed by hand when the first end is not in the recess.

18. The locking assembly of claim 16, further comprising a lateral flange on the plug, the flange being larger than the plug aperture to prevent overinsertion of the plug and upon full insertion of the plug to contact the body to assure that the plug is positioned within the body in a proper position to accept the first end of the locking screw.

19. The locking assembly of claim 16 wherein said second end of said locking screw is beveled, and said body, adjacent the locking screw aperture, is beveled to sealingly accept said second end of said locking screw so as to prevent fluid from entering the chamber via the locking aperture.

20. The locking assembly of claim 16, further comprising a washer adjacent said shaft aperture for being disposed between the enlarged portion of the threaded fastener and the body so that the enlarged portion cannot be turned by lifting and turning the body.

21. The locking assembly of claim 16 wherein said body and said locking screw have matching threads.

22. The locking assembly of claim 21, wherein said second end of said locking screw includes a unique recess pattern for receipt of a unique matching socket key for selectively permitting threading and unthreading said locking screw.

23. The locking assembly of claim 16, further comprising a burglar cable, captured in the slot, that secures outdoor equipment.

24. The locking assembly of claim 16, further comprising a burglar cable, captured in the slot, which cable is for securing one of the group consisting essentially of a riding lawnmower, four wheeler, three wheeler, motor vehicle, trailer, recreational equipment, sporting equipment, or other movable merchandise.

25. The locking assembly of claim 16, wherein the body has a flat side on its exterior for fitting against a flat surface of a device to which the threaded fastener is intended to be attached to help prevent turning of the body relative to the device.

26. The locking assembly of claim 16, wherein the shaft aperture is offset from the center of the body toward the side of the body opposite the locking aperture for allowing the assembly to be placed over the enlarged portion with the locking aperture facing away from an obstruction when the enlarged portion is relatively close to the obstruction and the obstruction would otherwise physically interfere with the body.

* * * * *